Figure 1:
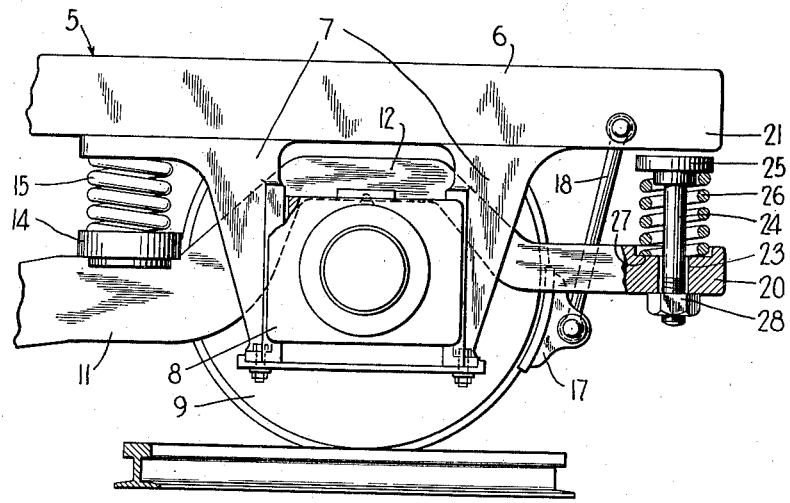

March 26, 1940.                     C. C. FARMER                     2,194,743
                                 WHEEL BRAKE DEVICE
                                  Filed June 9, 1938

INVENTOR
CLYDE C. FARMER
BY
ATTORNEY

Patented Mar. 26, 1940

2,194,743

UNITED STATES PATENT OFFICE 2,194,743

WHEEL BRAKE DEVICE

Clyde C. Farmer, Pittsburgh, Pa., assignor to The Westinghouse Air Brake Company, Wilmerding, Pa., a corporation of Pennsylvania Application June 9, 1938, Serial No. 212,825

2 Claims. (Cl. 105—194)

This invention relates to trucks for railway vehicles and more particularly to trucks employing auxiliary spring means adapted to absorb extraordinary forces acting on the frame of the truck and tending to overload the main truck springs.

The conventional passenger railway vehicle truck usually comprises wheel and axle assemblies carried by suitable journal boxes, on which are supported longitudinally arranged equalizing bars carrying resilient means including equalizer springs which in turn help to support the truck side-frame members. A truck bolster is transversely mounted on the side frame members and has the adjacent end of the car body secured thereto by means of the usual center bearing mechanism, which mechanism is thus carried a considerable distance above the axles. This arrangement provides the necessary freedom for relative motion between the wheels and the frame in order that road shocks transmitted to the car body will be minimized and in order also that the wheels may follow irregularities in the track. In a truck of conventional design, the brake shoes are hung from the frame and are almost universally mounted below the center line of the wheels for reasons of clearance, and to prevent brake shoe pressure from forcing the journal out of its bearing.

It has been found that when the brakes carried on a truck of the above type are applied to the wheels with great force while the vehicle is traveling at high speed, resultant forces cause the frame members to be pulled downwardly with respect to the wheels, these forces being augmented on the forward portion of the truck by reason of the inertia of the car body acting through the medium of the center bearing mechanism, and, in the case of a single shoe brake, by the drag of the shoes on the wheels. These extraordinary forces act on the truck in such a manner as to cause the frame to tilt with respect to the wheels, and may even cause the forward portion of the frame to dip into contact with unsprung members of the truck, thereby rendering the equalizer springs entirely ineffective to permit the necessary play between structural members of the truck. Undesired results of such overloading of the truck springs and abnormal displacement of the frame members include not only hard riding in the vehicle and dangerous stresses on the truck members, but also such variance of the normal forces acting between the wheels and the rails as may increase the tendency of the wheels to slide.

One object of the invention is to provide an improved vehicle truck assembly including spring means effective normally to permit the desired flexibility and relative movement between unsprung wheel-carried members and the sprung truck frame members, and rendered effective upon excessive displacement of the frame members during a heavy application of the brakes to yieldingly oppose further displacement.

Another object of my invention is to provide a compound equalizer spring means for a vehicle truck having maximum resiliency during normal operation of the truck for permitting the desired movement of the truck frame with respect to the wheels and axles, but operative, when high breaking forces tend to displace the sprung frame relative to the unsprung wheel-carried members a predetermined degree, to resiliently restrict said relative movement between the frame and wheels, whereby overloading of the truck springs is prevented.

It is a further object of my invention to provide a railway truck comprising longitudinally disposed equalizing bars supported on axle journal boxes, a frame supported through the medium of the usual equalizer springs by said equalizing bars, and auxiliary yielding means carried on the truck in cooperative relation with said frame and equalizing bars, which means is ineffective to resist normal, substantially parallel movement of the frame with respect to the equalizing bars, but becomes operative to oppose excessive obliquangular movement of said frame tending to overload the equalizer springs when the vehicle brakes are forcefully applied.

Other objects and advantages will appear in the following detailed description of the invention, taken with reference to the accompanying drawing, wherein—

Figure 2:
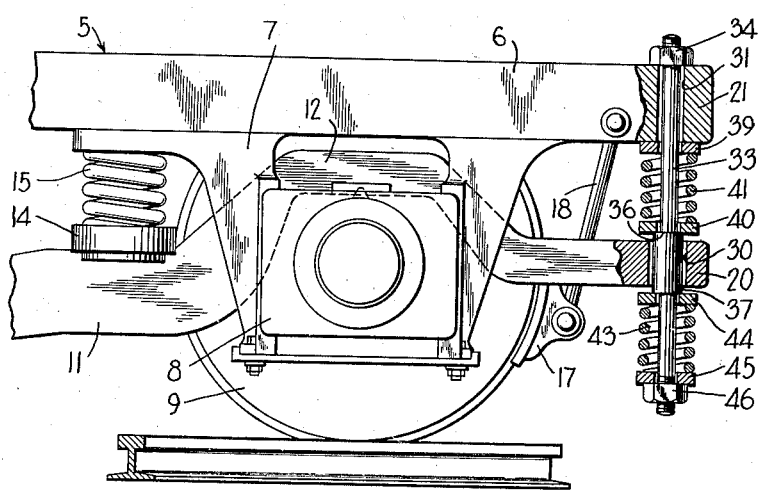
Figure 3:
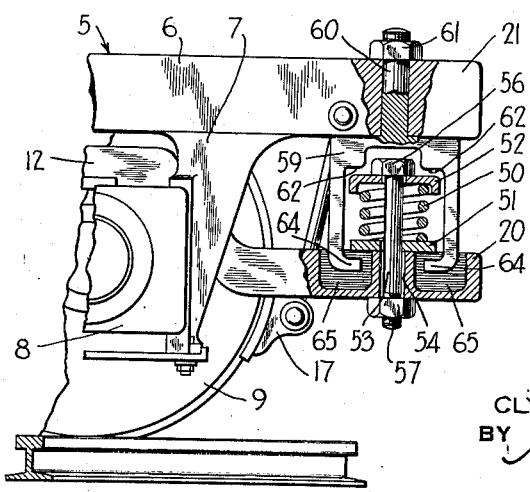

Fig. 1 is an elevational view, partly in section, of a portion of a railway vehicle truck embodying one form of my invention; and Figs. 2 and 3 are elevational views of similar trucks embodying different forms of the invention, respectively.

Referring to the drawing and particularly to Fig. 1 thereof, there is illustrated in simplified form a portion of a railway truck, including a wheel and the associated elements of the adjacent end of the truck, it being understood of course that the complete truck is of the type having at least four wheels. Although the truck may be of any suitable construction, it is illustrated in a design suitable for a passenger car and comprises a truck frame 5 having spaced side frame members, one of which is designated 6, and which are connected together by the usual transversely disposed transoms, not shown. Pedestal jaw members 7 are secured to the side frame members 6, and have slidably guided therein the usual journal boxes 8 associated with the bearings of the wheel and axle assemblies 9. For carrying each of the side frame members 6, there is provided a longitudinally disposed equalizing bar 11 having at each end a suitable offset portion 12 in rocking engagement with the upper surface of the corresponding journal box 8, and having secured thereto adjacent each offset portion a spring seat 14 upon which rests the usual equalizer spring 15 for supporting the truck frame. In addition to equalizer springs 15, of which there are usually four, there may be provided suitable elliptic springs, not shown, mounted intermediate the wheel and axle assemblies, or to the left of the wheel 9 as shown in Fig. 1.

The usual braking means may be provided, including a brake shoe 17 adapted to be applied to the wheel 9 below the center line thereof through the medium of a brake rigging apparatus, not shown. The brake shoe 17 is supported by means of a brake shoe hanger 18, the upper end of which is pivotally connected to the side frame member 6.

According to my invention, the equalizing bar 11 is provided at each end with a prolongated portion or arm 20, which extends longitudinally and in parallel alignment with the adjacent end portion 21 of the truck frame 6. It will be noted that the portion of the equalizing bar 11 intermediate the arm 20 and the bearing portion 12 is inclined downwardly so that the arm 20 is spaced from the portion 21 of the truck frame, as shown in the drawing.

The arm 20 of the equalizing bar has formed therein a vertically disposed bore 23, through which is slidably mounted one end of a plunger 24, which extends upwardly from the arm 20 and carries a buffer member 25 in operative alignment with the lower surface of the frame portion 21. A coil spring 26 is disposed around the plunger 24 between the member 25 and a depressed surface 27 of the arm 20 for urging the plunger upwardly. The plunger 24 is held in place and the spring 26 may be suitably tensioned by means of a nut 28, which is applied to the threaded portion of the plunger extending below the arm 20, and which is adapted normally to engage the lower surface of the arm as shown in the drawing. There will thus be such an auxiliary spring mechanism at each of the four corners of the truck.

In operation, assuming that the vehicle is moving toward the right-hand, if the brakes are applied with normal force, the truck frame 6 is not deflected appreciably with respect to the unsprung members of the vehicle truck by the braking forces, so that the truck springs including the equalizer spring 15 remain effective resiliently to support the weight of the truck frame and vehicle body in the usual manner, it being understood that sufficient clearance is provided between the end 21 of the truck frame and the buffer member 25 to allow for normal undulating motion of the truck frame with respect to the equalizing bar 11.

If, however, the brakes should be applied with maximum force while the vehicle is moving at a relatively high speed toward the right-hand direction, the momentum of the vehicle body, acting through the medium of the truck center bearing, may be sufficient to cause tilting of the truck frame 6 beyond the desired range of movement, as already explained. In thus tilting downwardly, the forward end 21 of the truck frame 6 engages the two forward buffer members 25, and further downward movement of the truck frame is then resiliently resisted by the force of the two forward coil springs 26, which act simultaneously with the equalizer springs 15 but at greater advantage than those springs by reason of the considerable leverage distance between the end 21 of the truck frame 6 and the center bearing thereon, not shown in the drawing. It will thus be seen that the extraordinary forces tending to displace the truck frame more than a predetermined degree with respect to the equalizing bar and other unsprung members are substantially absorbed by the pair of auxiliary springs 26 at the forward end of the truck, so that hard riding of the vehicle and possibly dangerous strains upon certain of the truck members are prevented.

Referring to Fig. 2 of the drawing, the modified form of my invention shown therein is embodied in a railway truck of the same type as that shown in Fig. 1. In this form of the invention, the auxiliary yielding mechanism is adapted to resist either downward or upward displacement of the end of the truck frame to which it is applied, when such displacement exceeds a predetermined degree. As shown in Fig. 2, the arm 20 of the equalizing bar 11 has formed therein a bore 30 which is disposed in vertical alignment with a bore 31 provided in the end 21 of the truck frame 6. Extending through both of the bores 30 and 31 is a vertically disposed spring hanger rod 33, which has secured to the upper end thereof a nut 34 engaging the upper surface of the truck frame 6 for holding the rod against downward movement. The portion of the rod 33 intermediate the ends thereof and normally disposed within the bore 30 is enlarged to form annular shoulders 36 and 37, each of which shoulders extends a suitable distance outwardly of the bore 30 as shown in Fig. 2. Slidably mounted on the hanger rod 33 intermediate the arm 20 of the equalizing member 11 and the end portion 21 of the truck frame are a pair of annular spring seats 39 and 40, which have interposed therebetween a coil spring 41 that is adapted to urge the seat 39 into engagement with the portion 21 and the seat 40 into engagement with the shoulder 36. It will be noted that the annular seat 40 is thus normally spaced above the upper surface of the arm 20.

Similarly, a coil spring 43 is mounted on the portion of the hanger rod 33 extending below the arm 20, the spring being interposed between an annular seat 44 normally engaging the shoulder 37 and an annular seat 45 which is held in engagement with a nut 46 having screw threaded connection with the lowermost portion of the rod 33. The spring seat 44 is thus normally held a suitable distance below the lower surface of the arm 20.

It will thus be apparent that when the vehicle is operating under usual conditions, the weight of the vehicle body carried by the truck 5 is resiliently supported by means of the standard truck spring apparatus including equalizer spring 15, while the auxiliary springs 41 and 43 at each of the four corners of the truck are maintained inactive by reason of the clearance provided between the equalizing arm 20 and the respective seats 40 and 44, which clearance permits a normal amount of motion of the truck frame 6 with respect to the equalizing bar 11 unopposed by either of the auxiliary springs.

If a heavy application of the brakes is effected while the vehicle truck 5 is traveling in a right-hand direction as viewed in Fig. 2, and the truck frame 6 is thereby tilted beyond the normal range of movement thereof, the forward end 21 of the frame is brought downwardly toward the arm 20 of the equalizing bar 11 while the truck spring apparatus including the equalizer springs 15 is overloaded, by reason of the extraordinary forces produced as the speed of the vehicle is thus suddenly decreased, as already explained. As the forward end 21 of the truck frame is thus forced downwardly, the hanger rod 33 is thereby carried in the same direction so that the spring seat 40 is brought into engagement with the arm 20 of the equalizing bar 11. Further movement of the truck frame toward the equalizing bar is then resisted by the auxiliary spring 41 acting together with the truck springs, such as the equalizer springs 15, for resiliently limiting the amount of displacement of the truck frame members with respect to the unsprung elements of the truck. At the same time, this action of the spring 41 mounted on the forward portion of the vehicle truck as shown in Fig. 2 in resisting obliquangular displacement of the truck frame 6 is aided, in the present embodiment of the invention, by similar action of springs corresponding to the springs 43 of Fig. 2 but carried on the opposite or rear portion of the vehicle truck, as will be understood from the following explanation.

Assuming that the portion of the vehicle truck shown in Fig. 2 is the rear portion, or in other words that the vehicle is traveling toward the left, when the truck frame 6 is tilted as a result of a heavy application of the brakes the end portion 21 will this time be moved upwardly and away from the arm 20 of the equalizing bar 11. The hanger rod 33 is thereby lifted until the spring seat 44 is brought into engagement with the lower surface of the arm 20 of the equalizing bar. The spring 43 is then effective to oppose further upward movement of the truck frame 6 and rod 33, in cooperation with the spring 41 at the forward end of the truck as hereinbefore explained. In this embodiment, therefore, undesired tilting action of the truck is resisted at both the front and rear ends of the truck.

Referring to Fig. 3 of the drawing, the third embodiment of the invention therein illustrated comprises an auxiliary spring mechanism adapted to operate in a manner similar to that of the embodiment shown in Fig. 2 for preventing excessive displacement of the adjacent end of the truck frame either upwardly or downwardly. The spring mechanism shown in Fig. 3 comprises a single coil spring 50 interposed between an annular spring seat 51 and an annular spring guide plate 52, which are slidably mounted on a vertically disposed bolt 53 having the lower portion thereof extending through a suitable bore 54 formed in the arm 20 of the equalizing bar. The bolt 53 has a head 56 engaging the guide plate 52, and is provided with a nut 57 which has screw-threaded connection with the portion of the bolt extending beyond the arm 20 and engages the lower surface of the arm for a limiting upward movement of the plate 52.

Secured to the portion of the frame 6 above the arm 20 of the equalizing bar is a buffer member 59, which has an elongate bolt portion 60 extending through a suitable bore formed in the portion 21 and rigidly secured thereto by means of a nut 61. The member 59 has a pair of shoulders 62 disposed in alignment with the plate member 52, which is adapted to engage the shoulders when the frame 6 is moved downwardly beyond a predetermined range. For limiting upward movement of the frame 6 with respect to the equalizing bar, the buffer member 59 has formed thereon two leg portions terminating in inwardly turned lugs 64, which extend into suitable recesses or slots 65 formed in the arm portion 20 of the equalizing bar. As shown in the drawing the lugs 64 are aligned with the lower surface of spring seat 51, and are normally spaced from the seat for permitting a certain range of upward movement of the truck frame 6 with respect to the equalizing bar free from any opposing force of the auxiliary spring 50.

The operation of the device shown in Fig. 3 will be understood from the foregoing description of the other embodiments of the invention. It will thus be seen that excessive downward movement of the end 21 of the truck frame 6 will cause engagement of the shoulders 62 of the buffer member 59 with the spring plate 52 so that further movement will be resisted by the force of the spring 50. Similarly excessive upward movement of the truck frame 6 with respect to the unsprung portion of the truck will bring the lugs 64 into engagement with the lower spring seat 51, which is adapted for resilient upward movement along the bolt 53 against the force of the spring 50.

It will be apparent from the foregoing description that auxiliary spring mechanisms constructed in accordance with the invention may be mounted on the ends of a railway truck without necessitating material alterations in the structural members thereof, and that the auxiliary spring means will effectively resist excessive displacement of the truck frame due to high braking forces, while remaining inactive when the vehicle truck is operated under normal conditions and while the truck frame is adequately supported by the usual truck springs, including the relatively soft equalizer springs.

Having now described my invention, what I claim as new and desire to secure by Letters Patent, is:

1. In a railway truck including a frame having pedestals, spaced wheeled axles having journal boxes guided by said pedestals, longitudinally disposed equalizing bars supported on the journal boxes at each side of the truck and having prolongated arms extending longitudinally beyond said journal boxes at the ends of the truck and in alignment with the adjacent ends of said frame, and truck springs interposed between said frame and said equalizing bars intermediate said wheeled axles for normally transmitting the full load from the frame to said equalizing bars, the combination with said prolongated arms and adjacent ends of the frame of normally inactive auxiliary spring devices carried at each of the four corners of the truck to resist excessive tilting movement of said frame due to heavy braking, each of said devices comprising a pair of follower members operatively mounted on the prolongated arm of the equalizing bar, a spring vertically interposed between said follower members, and a buffer member secured to said frame in operative alignment with said spring and having a shoulder normally spaced above one of said follower members and depending arm portions straddling said spring and terminating in lugs spaced beneath said other follower member.

2. In a railway truck having a sprung frame part and an unsprung frame part having arms projecting therefrom adjacent to and in alignment with the sprung frame part, in combination therewith, normally inactive spring devices carried by said arms to resist tilting movement of said sprung frame part due to heavy braking, each of said spring devices comprising a pair of follower members operatively mounted on the arms of said unsprung frame part, a spring vertically interposed between said follower members, and a buffer member secured to said sprung frame part in operative alignment with said spring and having a shoulder normally spaced above one of said follower members and depending arm portions straddling said spring and terminating in lugs spaced beneath said other follower member.

CLYDE C. FARMER.